United States Patent
Yamato

(10) Patent No.: US 7,680,837 B2
(45) Date of Patent: Mar. 16, 2010

(54) FILE MANAGEMENT METHOD FOR LOG-STRUCTURED FILE SYSTEM FOR SEQUENTIALLY ADDING AND STORING LOG OF FILE ACCESS

(75) Inventor: Junichi Yamato, Tokyo (JP)

(73) Assignee: NEC Corporation, Tokyo (JP)

( * ) Notice: Subject to any disclaimer, the term of this patent is extended or adjusted under 35 U.S.C. 154(b) by 578 days.

(21) Appl. No.: 11/585,092

(22) Filed: Oct. 24, 2006

(65) Prior Publication Data

US 2007/0106707 A1    May 10, 2007

(30) Foreign Application Priority Data

Nov. 8, 2005    (JP)    ............... 2005-323720

(51) Int. Cl.
*G06F 17/30* (2006.01)
*G06F 17/00* (2006.01)

(52) U.S. Cl. ............... 707/202; 711/113; 711/118
(58) Field of Classification Search .............. None
See application file for complete search history.

(56) References Cited

U.S. PATENT DOCUMENTS

| | | | |
|---|---|---|---|
| 5,594,275 A | 1/1997 | Kwon et al. | |
| 6,813,678 B1 * | 11/2004 | Sinclair et al. | 711/103 |
| 7,010,645 B2 * | 3/2006 | Hetzler et al. | 711/113 |
| 7,451,168 B1 * | 11/2008 | Patterson | 707/206 |

| | | |
|---|---|---|
| 2003/0229753 A1 | 12/2003 | Hwang |

FOREIGN PATENT DOCUMENTS

| | | |
|---|---|---|
| CN | 86105249 A | 2/1987 |
| CN | 1106164 A | 8/1995 |
| JP | 10-031611 | 2/1998 |
| JP | 11-272537 | 10/1999 |
| JP | 2001-101071 | 4/2001 |
| JP | 2003-015928 | 1/2003 |
| JP | 2004-013895 | 1/2004 |

OTHER PUBLICATIONS

Rosenblum et al., "The Design and Implementation of a Log-Structured File System", 1992, ACM, vol. 10, pp. 26-52.*
Kawaguchi et al., "A Flash-Memory Based File System", 1995, In Proceedings of the Winter 1995 USENIX Technical Conference, pp. 155-164.*
D. Woodhouse, "JJFS: The Journaling Flash File System," pp. 1-12.
U. Vahalia, "UNIX Internals: The New Frontiers," Perason Education Japan, May 15, 2000, pp. 398-399.
M. K. McKusick, et al., "The Design and Implementation of the 4.4BSD," Oct. 10, 2003, pp. 331-350.

* cited by examiner

*Primary Examiner*—James Trujillo
*Assistant Examiner*—Dawaune Conyers
(74) *Attorney, Agent, or Firm*—Foley & Lardner LLP

(57) ABSTRACT

There is disclosed a file management method in a log-structured file system for storing accesses to files that are sequentially performed by sequentially adding logs. A storage area of a storage medium is previously divided into a data area for storing a log including data of the file and a management area that can store management information related to the log stored in said data area for a plurality of entries. Then, the management information including a first number indicating the order of writing the entry is added and stored in the management area as a new entry.

23 Claims, 14 Drawing Sheets

FILE MANAGEMENT METHOD FOR LOG-STRUCTURED FILE SYSTEM FOR SEQUENTIALLY ADDING AND STORING LOG OF FILE ACCESS

This application is based upon and claims the benefit of priority from Japanese Patent Application No. 2005-323720 filed on Nov. 8, 2005, the content of which is incorporated by reference.

BACKGROUND OF THE INVENTION

1. Field of the Invention

The present invention relates to a file management method for a storage medium accessed from a processor, and in particular, relates to a file management method suitable for a storage medium having a limitation on the number of times data is erased.

2. Description of the Related Art

A computer file system that stores data in a storage medium on a file-by-file basis mediates to store a file in various media. For example, flash memory that is suitable for increasing capacity, is electrically rewritable, does not lose data if the power source is turned off, and is used to store files. Though data can be written into the flash memory in small units, such as a byte, the written data must be erased in large units, like a block.

Then, there is a limitation on the number of times data in the flash memory is erased. Therefore, when a flash memory is used as a storage medium, the flash memory is used in such a way that the numbers of erase operations for each block are equalized, to extend a usable period as long as possible. The equalization of the number of erasing times is called "wear leveling".

In the file system using a flash memory as a storage medium, like a JFFS (Journaling Flash File System) by David Woodhouse, the technique of "log-structured" (Uresh Vahalia, "UNIX Internals: The New Frontiers", Perason Education Japan, May 15, 2000, pp. 398 to 399) is used.

"Log-structured" is a data storing method in which data is continuously added and stored one after another without being overwritten. According to this method, the old data remains stored in a log structured array among data that are continuously stored. Then, the remaining data that are stored in a log structured array contain both valid and invalid data. Therefore, according to the "log-structured" file system, like JFFS, in the mount process that is executed at the start of use, all data in flash memory are read, and a range of significant data is identified. In the "log-structured" technique, like this, since data is not locally erased, the blocks of data can be used equally.

However, the above-mentioned conventional technique has the following problem.

According to the "log-structured" file system, the number of erase operations in a storage area can be equalized and the usable period can be prolonged. However, in such a file system, since it is necessary to check all data in the storage medium to be mounted and to screen out a valid data range in order to find a front log in the mount process. There is a problem that the process is lengthy and it takes much time at the start of the operation.

As another conventional file system, there is a file system in which a file management structure is recorded in an index file to recognize the entire structure easily. As such a file system, there is a LFS (Logstructured File System) of 4.4BSD (Berkeley Software distribution.) For example, see Marshall Kirk Mckusick, Keith Bostic, Michael J. kareles, Johon S. Quarterman, "The Design and Implementation of the 4.4BSD", Oct. 10, 2003, pp. 331 to 350.

However, in the LFS, though the position of the index file changes in the storage madium, the management information showing the position of the index file is recorded in the superblock whose the position is fixed. Therefore, the contents of the superblock are updated whenever the position of the index file changes through update.

Therefore, the number of erase operations in the block used as the superblock is larger than the number of erase operations in another block, and therefore the number of erasing times is not equalized. Accordingly, the entire usable period of the flash memory is determined by the number of erasing times in the superblock.

SUMMARY OF THE INVENTION

The object of the present invention is to provide a file system that prolongs the usable period of a storage medium and shortens the time taken to start using the storage medium.

To attain the object, the file management method of the present invention is a file management method in a log-structured file system in which sequential accesses to files are recorded by adding logs sequentially. Then, the storage area of the storage medium is divided into a data area that stores a log including file data and a management area that can store management information related to the log stored in the data area for a plurality of entries. Successively, the management information including the first number showing the order of the written entry is added and recorded in the management area as a new entry.

According to the present invention, the management area for storing the management information of the log recorded in the storage medium can store the plurality of entries, and the management information is added and stored. Therefore, since only the management information is referred at the start of use and the entire storage area does not have to be checked, the time at the start of use can be shortened. Also, since the management information is not overwritten in the previous entry but is added and stored as a new entry, the number of erase operations in the area used to record the management information is reduced, and the usable period of the storage medium can be prolonged.

The above and other objects, features, and advantages of the present invention will become apparent from the following description with references to the accompanying drawings which illustrate examples of the present invention.

DETAILED DESCRIPTION OF THE PREFERRED EMBODIMENTS

Detailed explanations are given of embodiments for carrying out the present invention with reference to drawings.

First Embodiment

Figure 1:
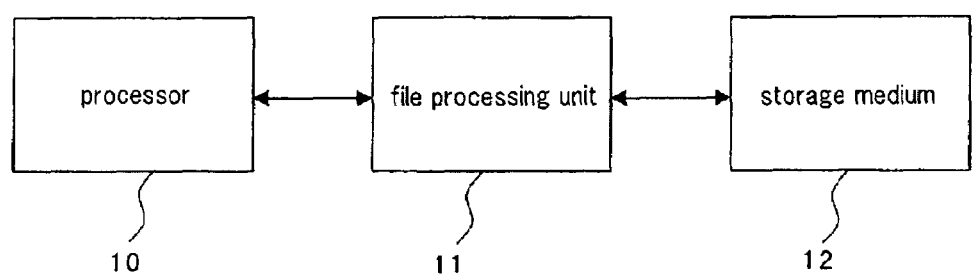
FIG. 1 is a block diagram showing a configuration of a computer system according to the first embodiment.

FIG. 1 is a block diagram showing a configuration of a computer system according to the first embodiment. Referring to FIG. 1, the computer system includes processor 10, file processing unit 11, and storage medium 12.

Processor 10 executes a predetermined calculation process by executing a program, not shown.

File processing unit 11 mediates an access from processor 10 to storage medium 12, and writes and reads into/from a file in storage medium 12 in accordance with a request from processor 10. The file system used in file processing unit 11 of the first embodiment is "log-structured". Therefore, even if the file is written into the block in the file that is already stored in storage medium 12, i.e., "update writing", file processing unit 11 does not write over the old data, but generates and adds a new log into storage medium 12, and invalidates the old log.

Storage medium 12 is a storage medium having a limitation on the number of erase/write cycles, and is flash memory or the like.

Figure 2:
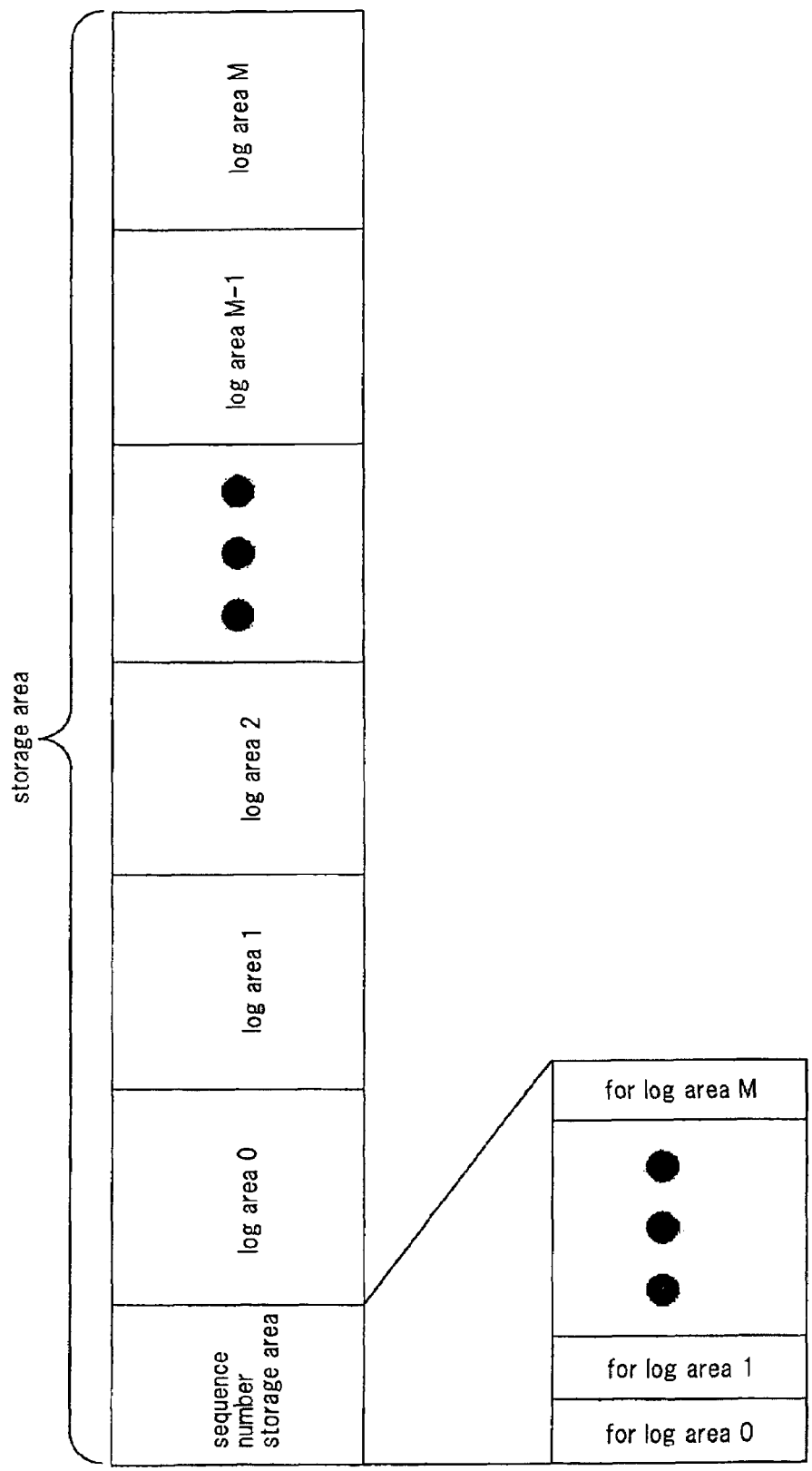
FIG. 2 is a view showing an image of the arrangement of data stored in a storage medium according to the first embodiment.

FIG. 2 is a view showing an image of arrangement of data stored in the storage medium according to the first embodiment. Referring to FIG. 2, the storage area in storage medium 12 is divided into a sequence number storage area and a plurality of log areas.

A unit of data written in storage medium 12 is called a log. A plurality of logs may be stored in one log area, or one log lies across a plurality of log areas. Also, all of the log areas may be similar in size, or each may be different.

Figure 3:
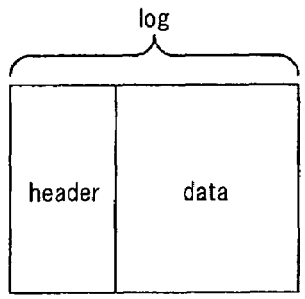
FIG. 3 is a view showing an arrangement of a log stored in a log area.

FIG. 3 is a view showing an arrangement of a log stored in the log area. Referring to FIG. 3, the log includes a header part and a data part. The header part includes a log size, a version number, an invalid flag, file position information, position information of a data block in the file, and the like. The version number is a number showing the order of writing the log. The newness of each log can be known by the version number.

Returning to FIG. 2, the sequence number storage area is a management area including a plurality of entries. The plurality of entries each correspond to the plurality of log areas, and the sequence number of each log area is stored. The sequence number is a number showing the order of writing the log into the log area. Based on this sequence number, the log area into which the newest log is written can be identified.

Incidentally, there are valid states and invalid states, as the log state, and these states are shown by an invalid flag. When an invalid flag is set, an invalid log is shown, and when no invalid flag is set, a valid log is shown. The invalid flag may show an invalid condition (a set state) in the bit inversion date where data has been erased. In flash memory, since the erase state is "1", the set state may be shown when the invalid flag is set to "0". Based on this arrangement, it becomes unnecessary to erase the data to shift the log state from valid to invalid, and the usable period of the storage medium can be prolonged.

In this explanation, the (valid) log that is most newly written is called a front log, and the valid log that is earliest written is called a rearmost log.

Figure 4:
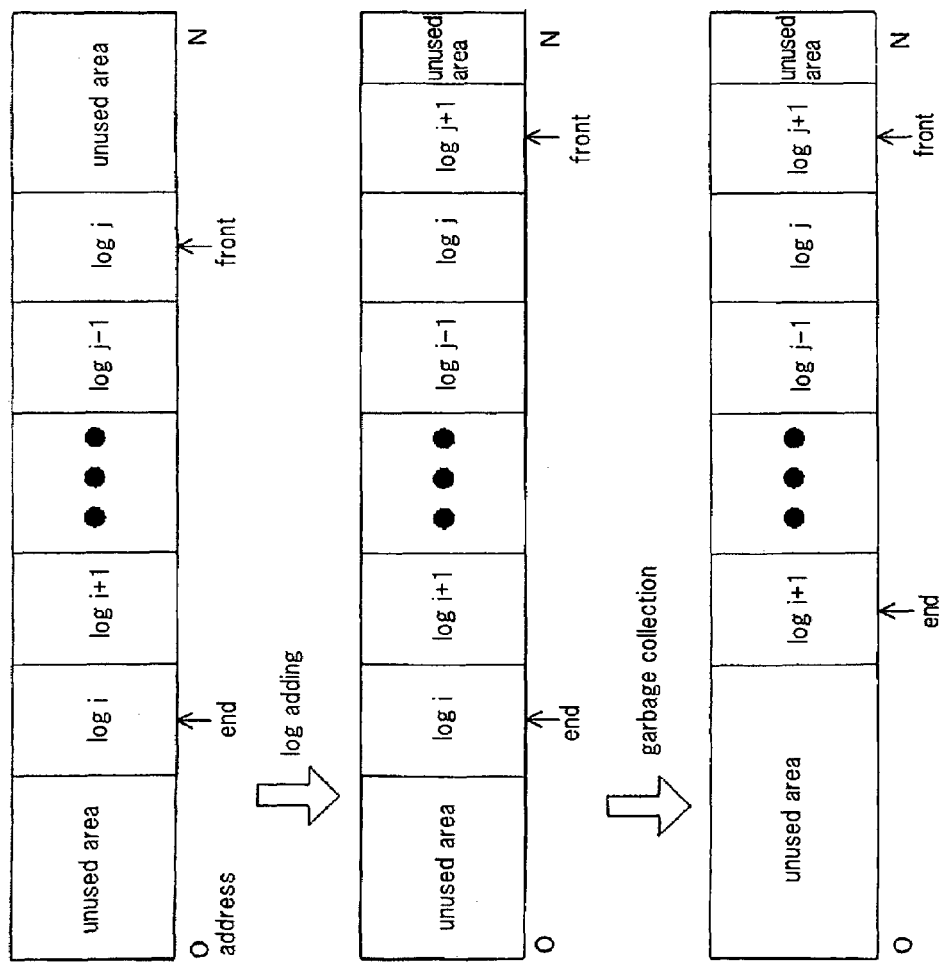
FIG. 4 is a view showing one example of variations of data stored in the storage medium.

Next, the operation of the computer system is explained according to the first embodiment. FIG. 4 is a view showing one example of variations of data stored in the storage medium. In the upper state in FIG. 4, log i to log j are stored in storage medium 12. When log (i+1) that is newly generated is added to the front log, the middle state in FIG. 4 is obtained. Incidentally, though data is written into the file block that is already recorded in storage medium 12, a new log is generated.

Further, when log i is released by the garbage collection, the rearmost log is log (i+1) as shown in the lower stage in FIG. 4.

Next, explanations are given of the operation of file processing unit 11 that is requested to read a file by processor 10.

When processor 10 designates a file and a block in the file and requests that they be read, file processing unit 11 searches a valid log that stores the data of the designated block of the designated file in storage medium 12. When the front log has been known at this time, an object log may be searched in order from the front log to the rear. Also, when both the front log and the rearmost log have been known, an object log may be searched between the front log and the rearmost log. When the object log is found by searching, file processing unit 11 acquires the data in storage medium 12 corresponding to the object log in storage medium 12 and returns the data to processor 10.

Figure 5:
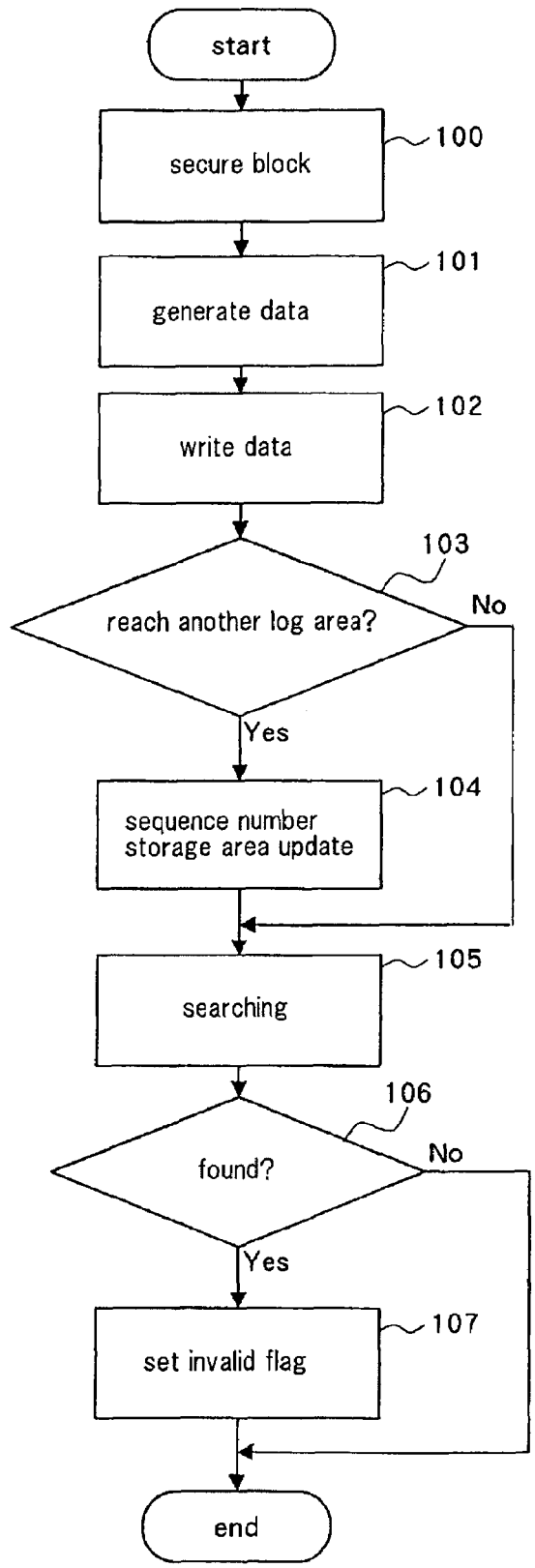
FIG. 5 is a flow chart showing a writing operation of a file processing unit according to the first embodiment.

Next, explanations are given about the operation of file processing unit 11 which receives instructions from unit 11 to write a file by processor 10. FIG. 5 is a flow chart showing a writing operation of the file processing unit. File processing unit 11 receives a writing request from processor 10. The writing request designates a file into which data is written, a block position in the file, and data to be written.

Referring to FIG. 5, first, file processing unit 11 secures that a block required to write the designated data next to the front log that is already stored in storage medium 12 (Step 100). Then, file processing unit 11 generates a header to be written in the header part and data to be written in the data part (Step 101).

Here, it is assumed that the version number to be written in the header is larger then the version number of the front log at that time. For example, the version number may be incremented one by one. In this case, file processing unit 11 adds one to the version number of the front log at that time and this is used as the new version number of the front log. Alternatively, a small value may be used instead of a value that is larger than the version number of front log at that time. In this case, the smaller version number indicates the log that is more newly stored.

Based on this operation, the version number of the front log is largest among all version numbers of logs, and the front log can be detected. Incidentally, the version number is a finite number representing the version number with a limitation on the number of bits (the number of digits), however, when the number of digits is sufficiently secured, the front log can be discriminated among logs in storage medium 12.

Then, file processing unit 11 writes the header and the data generated in Step 101 into the block secured in Step 100 (Step 102).

Successively, file processing unit 11 determines whether or not the area secured in Step 100 reaches another log area from the log area including the front log (Step 103). When the secured area reaches another log area, file processing unit 11 writes a sequence number that is larger than the sequence number of the log area including the front log at the time before a new log is added, into the entry that corresponds to the log area that has been newly reached (Step 104). For example, the sequence number may be incremented one by one. In this case, file processing unit 11 adds one to the sequence number of the log area including the front log at that time and is used as a sequence number of the log area that has been newly reached. Incidentally, the sequence number is a finite number representing the sequence number with a limitation on the number of bits (the number of digits), however, when the number of digits is sufficiently secured, the log area including the front log can be discriminated among the log areas in storage medium 12. Also, a small value may be used instead of a value that is larger than the sequence number of the log area including the front log at that time. In this case, the smaller sequence number indicates the log that is more newly stored.

Then, file processing unit 11 sets the log into which the data and the header are written in Step 102 as a front log and searches storage medium 12 to determine whether or not there is a log similar to the front log in the file to be written and similar to the block position in the direction from the front log to the rearmost log (Step 105), and determines whether or not an applicable log is found (Step 106).

When the log corresponding to the file to be written and the block position are found (Step 107), file processing unit 11 sets the invalid flag for the log and terminates the process. When no log is found, file processing unit 11 terminates the process as is.

Next, explanations are given of the operation with consideration given to a case in which file processing unit 11 abnormally terminates the writing process and a contradiction arises in the invalid flag.

Here, in the writing process shown in the flow chart in FIG. 5, it is assumed that the process of file processing unit 11 is abnormally terminated before Step 107 and after Step 102. In this case, two logs that store the same block of the same file remain in storage medium 12. Then, in this case, the data having the larger version number in the header is newer. So, for example, in the mount process, file processing unit 11 sets the invalid flag for only the log having the smaller version number and sets the log having the larger version number as valid. Based on this operation, when the use of storage medium 12 is restarted after abnormal termination, a correct data file can be used.

Figure 6:
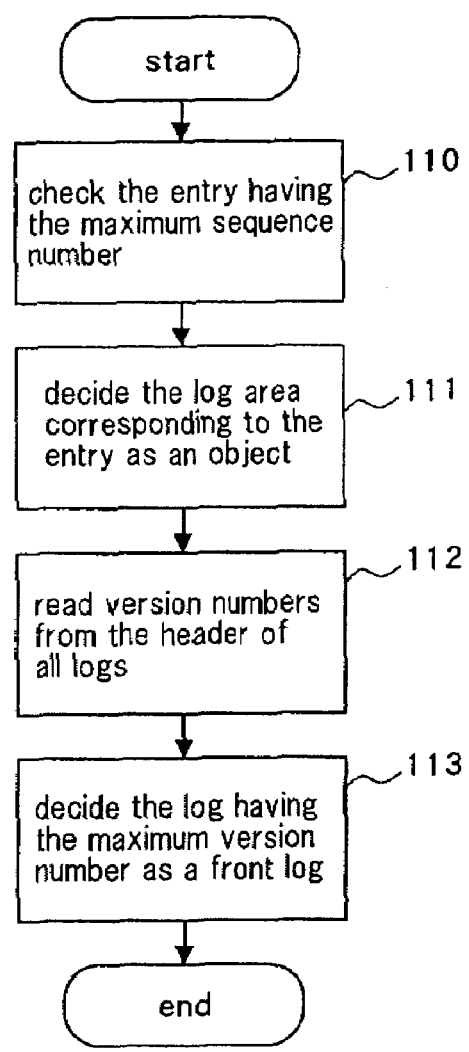
FIG. 6 is a flow chart showing an operation of file processing unit 11 when starting to use the file system.

Next, explanations are given of the operation of file processing unit 11 when use of the file system is started. FIG. 6 is a flow chart showing the operation of file processing unit 11 when the use of the file system is started. At the start of use, file processing unit 11 executes various processes as the mount process, however, only the process of searching the front log, which is related to the present invention, is explained.

Referring to FIG. 6, first, file processing unit 11 checks the entry having the maximum sequence number from the sequence number storage area in storage medium 12 (Step 110). Successively, file processing unit 11 decides the log area corresponding to the entry as an object that is used to find a front log (Step 111). Then, file processing unit 11 reads version numbers from the header of all logs in the log area (Step 112).

Successively, file processing unit 11 researches the maximum version number among the obtained version numbers and decides the log having the maximum version number as a front log (Step 113).

Next, explanations are given of the operation with consideration given to a case in which file processing unit 11 abnormally terminates the writing process and a contradiction arises in the newest log between the sequence number storage area and the log area.

Here, in the writing process shown in the flow chart in FIG. 5, it is assumed that the process of file processing unit 11 is abnormally terminated before Step 104 and after Step 102. In this case, a state may occur in which no newest log exits in the log area corresponding to the entry to which the maximum sequence number is given in the sequence number storage area, and the newest log exits in the subsequent log area.

In the "log-structured" file system according to the first embodiment, when all the storage areas are sequentially used, the process is returned to the start and a new log is overwritten in an area in which the log is stored in the previous cycle. In the first cycle, the areas subsequent to the area in which the front log is stored are erased, however, in the second and subsequent cycles, the invalid logs that are stored in the previous cycle remain in the areas subsequent to the area in which the front log is stored.

Therefore, when the log writing in Step 102 and the sequence number writing in Step 104 are normally performed, in the areas subsequent to the area in which the front log is stored, logs are erased or logs having a smaller sequence number than the front log exit.

Figure 7A:
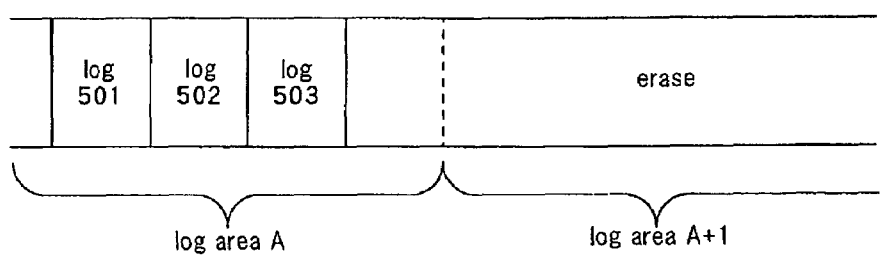
FIG. 7A is a view showing a state of the storage area into which logs are written in a first cycle.

FIG. 7A is a view showing a state of the storage area in which logs are written in the first cycle. In this explanation, the log area corresponding to the entry to which the maximum sequence number is given in the sequence number storage area is regarded as log area A. In FIG. 7A, front log 503 is stored in log area A. Because of the first cycle, the areas before front log 503 are erased.

Figure 7B:
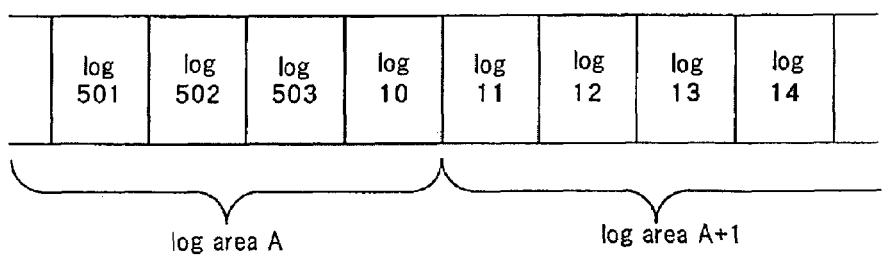
FIG. 7B is a view showing a state of the storage area into which logs are written in a second or subsequent cycle.

FIG. 7B is a view showing a state of the storage area in which logs are written in the second or subsequent cycle. In FIG. 7B, front log 503 is stored in log area A corresponding to the entry to which the maximum sequence number is given in the sequence number storage area. Because of the second or subsequent cycle, logs 10, 11, 12 . . . that are stored in the previous cycle remain in the areas before front log 503.

Figure 7C:
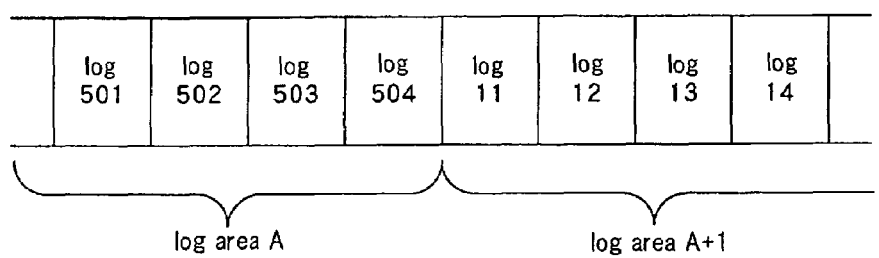
FIG. 7C is a view showing a state of the storage area into which logs are written to the end of the log area.

FIG. 7C is a view showing a state of the storage area in which logs are written to the end of the log areas. In FIG. 7C, an example is shown in which logs are stored in the second or subsequent cycle. The logs are written just to the end of log area A corresponding to the entry to which the maximum sequence number is given in the sequence number storage area. The front log is log 504. In the areas subsequent to the boundary between log area A and log area A+1, the logs that are written in the previous cycle remain.

In such a normal state, after a new front log is stored in a new log area, when the process is abnormally terminated before the sequence number storage area is updated, there is in fact no front log in the log area corresponding to the entry to which the maximum sequence number is given in the sequence number storage area, and areas are filled with logs to the end of the log area. In this case, the actual front log exits in the next log area or in the subsequent log area thereto.

Figure 7D:
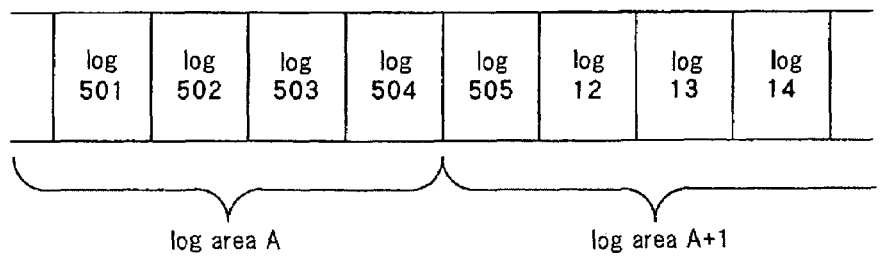
FIG. 7D is a view showing a state of the storage area when the process is abnormally terminated before the sequence number storage area is updated.

FIG. 7D is a view showing the state of the storage area when the process is abnormally terminated before the sequence number storage area is updated. Referring to FIG. 7D, logs are written in log area A up to the boundary with log area A+1 and that correspond to the entry to which the maximum sequence number is given in the sequence number storage area. When consideration is given to only this, this state is similar to the normal state shown in FIG. 7C and cannot be discriminated. However, in fact, logs are also written in log area A+1.

So, first, file processing unit 11 according to the first embodiment checks the version number of the last log in log area A corresponding to the entry to which the maximum sequence number is given in the sequence number storage area and in the version number of logs which are not last log in log area A.

At this time, in the state shown in FIG. 7A or 7B, there is no possibility that the front log exits in the next or subsequent log areas, and it can be determined that the front log exits in log area A. However, when the logs are written in log area A to the end and the version number of the last log is maximum in log area A, it cannot be determined whether the normal state in FIG. 7C or whether the abnormal state is in FIG. 7D. Therefore, file processing unit 11 must check next log area A+1 in this case.

When the logs are written to the end of the log area and the version number of the last log is the maximum number in log area A, file processing unit 11 checks the version number included in the header of the first log in next log area A+1.

Then, when the version number of the first log in next log area A+1 is larger than the version number of the last log in log area A, file processing unit 11 searches a front log from log area A+1. Then, file processing unit 11 writes a value larger than the sequence number given to log area A into the entry corresponding to log area A+1 in the sequence number storage area.

Based on this operation, a correct front log can be recognized when the use of storage medium 12 is restarted after abnormal termination.

Also, according to this operation, when the log area in which the original front log is stored is detected after abnormal termination, regardless of the presence or absence of a new writing operation, file processing unit 11 corrects the version number storage area to return to a normal state. If the version number storage area is not corrected when no writing operation is performed, both two log area A and log area A+1 must be again searched on the next startup, and a unnecessary process is required. In the first embodiment, since the version number storage area is corrected regardless of the presence or absence of the writing operation, the state of storage medium 12 can be corrected, and it becomes unnecessary to increase the search area when use of the file system is started next time.

Incidentally, the file system of the first embodiment performs garbage collection, similar to another general "log-structured" file system. At this time, file processing unit 11 arranges the logs while referring to the invalid flag in the header in order to bring valid logs together in a small range, and secure an unused block in the previous area to the far side of the front log in storage medium 12.

In the first embodiment, only the sequence number of each log area is stored in the sequence number storage area of storage medium 12. However, as a modification of the first embodiment, the start position information of the log that is first stored in the log area may be stored in addition to the sequence number of each log area. With this operation, the boundary of logs can be easily recognized though the boundary of logs is not matched with the boundary of log areas.

Figure 8:
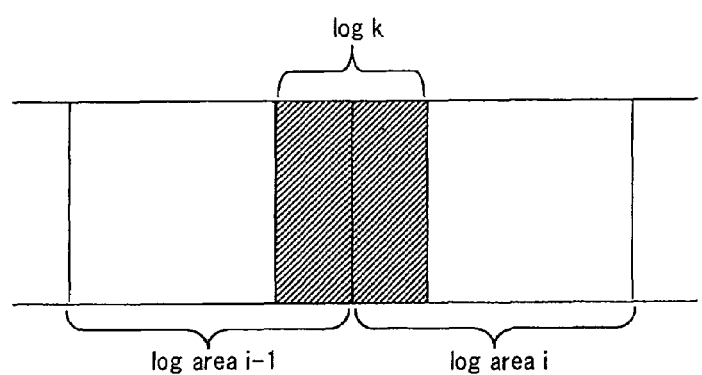
FIG. 8 is a view showing a state where logs are stored in the storage medium across a boundary of log areas.

FIG. 8 is a view showing a state in which logs are stored across the boundary of log areas. As shown in FIG. 8, when log k is newly stored, the front log is changed from log area i−1 to log area i.

At this time, in this modification, a sequence number larger than the sequence number of log area i−1 is stored in the entry corresponding to log area i of the sequence number storage area. Further, the start position information indicating the start position of log k is stored in the entry of log area i in addition to this sequence number. Based on this operation, even if the start position of log k is not matched with the boundary of log areas, the start position thereof can be easily known and each log that is subsequent to this can be identified separately.

As described above, according to the first embodiment, the area for storing the sequence number, which is the management information of logs stored in storage medium 12, can store a plurality of entries, and when management information must be stored in order to add a log in a new log area, the management information is added as a new entry without being overwritten on the previous entry. Therefore, the front log can be quickly detected when reference is made to management information at the time that use of flash memory is started, no process for checking the entire storage area is required and the time needed to start up flash memory can be shortened. Also, since the management information is added as a new entry without being overwritten in the same area as the previous time, the number of erase operations can be reduced in the area for storing the management information, and the life cycle of storage medium 12 can be prolonged.

Also, according to the first embodiment, the area for storing logs is divided into a plurality of log areas, the sequence number storage area for storing the management information is also divided into a plurality of areas each corresponding to the log areas, and the management information is written in the sequence number storage area only at the first writing operation in the corresponding log area. Therefore, the number of deletions in the sequence number storage area can be equalized to that of the log area, and the usable period of storage medium 12 can be prolonged.

Further, according to the first embodiment, the newest entry is found among the sequence numbers of the plurality of entries stored as the management information, the log area corresponding to the entry is regarded as an object to be searched, and the front log is detected from the version number of each log in the log area. Therefore, the time needed to start use of storage medium 12 can be shortened.

Moreover, according to the first embodiment, since each entry includes information indicating the start position of the first log in the corresponding log area, the position of the log can be easily recognized even if the boundary of the log areas is not matched with the boundary of logs, and the time needed to start use of storage medium 12 can be shortened.

Second Embodiment

The second embodiment is different from the first embodiment in that an area for storing the sequence number of each log area is divided for each log area.

Figure 9:
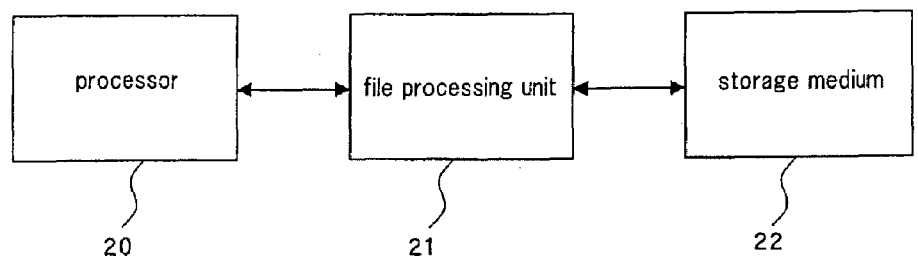
FIG. 9 is a block diagram showing a configuration of a computer system according to the second embodiment.

FIG. 9 is a block diagram showing a configuration of a computer system according to the second embodiment. Referring to FIG. 9, the computer system includes processor 20, file processing unit 21, and storage medium 22. Processor 20 and storage medium 22 are similar to processor 10 and storage medium 12 in the first embodiment.

File processing unit 21 mediates an access from processor 20 to storage medium 22 and writes and reads a file to/from storage medium 22 according to a request from processor 20, similar to file processing unit 11 of the first embodiment.

Also, the file system used in file processing unit 21 of the second embodiment is "log-structured". Therefore, even if the file is written into the data block in the file that is already stored in storage medium 22, i.e., "update writing", file processing unit 21 does not write over the old data, and generates a new log in storage medium 22.

File processing unit 21 of the second embodiment is different from the first embodiment in that the area management information is separately arranged for each log area.

Figure 10:
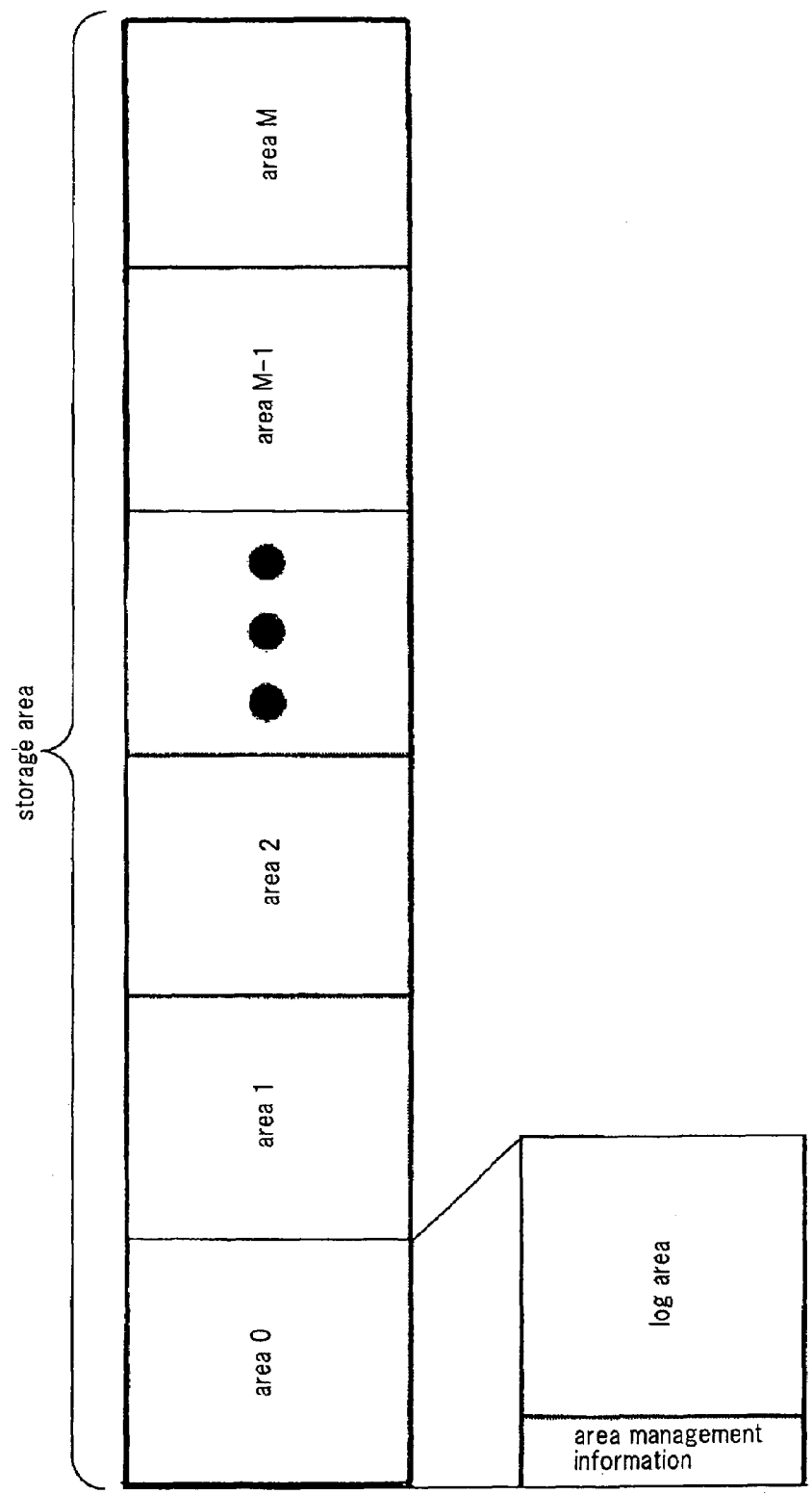
FIG. 10 is a view showing an image of arrangement of data stored in a storage medium according to the second embodiment.

FIG. 10 is a view showing the image of arrangement of data stored in the storage medium. Referring to FIG. 10, the storage area of storage medium 22 is divided into a plurality of areas O to M. Each divided area may be similar or may be different in size. Then, each area includes area management information and a log area. The area management information includes a sequence number of a corresponding log area. The log area is an area for storing a plurality of logs. The log is similar to that of the first embodiment, and includes the header part and the data part, as shown in FIG. 3.

Next, the operation of the computer system is explained in the second embodiment.

The operation of file processing unit 21 that is requested to read a file from processor 20 is similar to the operation of file processing unit 11 of the first embodiment.

Figure 11:
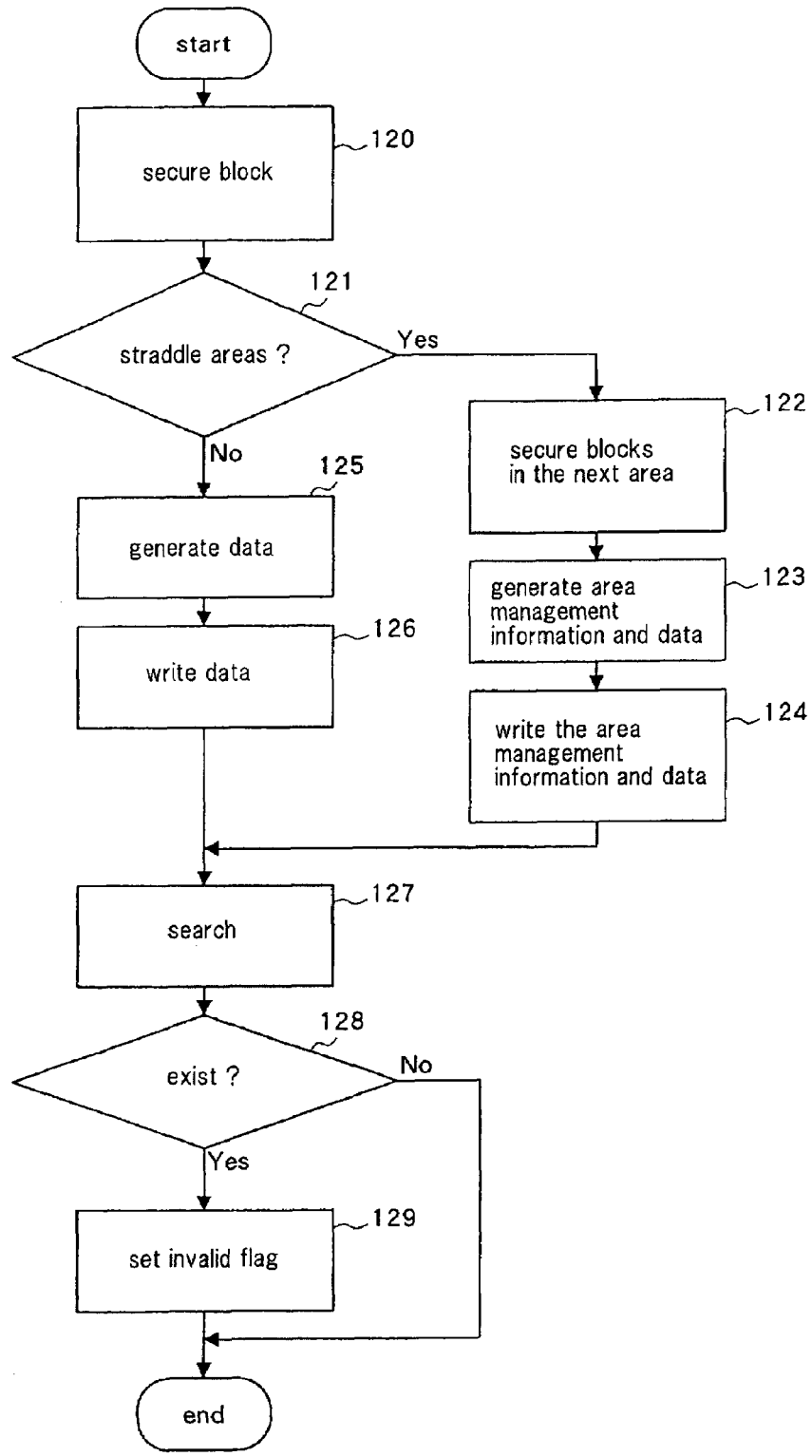
FIG. 11 is a flow chart showing a writing operation of a file processing unit according to the second embodiment.

FIG. 11 is a flow chart showing the writing operation of the file processing unit in the second embodiment. File processing unit 21 secures blocks that are needed to write data in the next or subsequent area to the front log that is already stored in storage medium 22 (Step 120). Then, file processing unit 21 determines whether or not the block secured in Step 120 is within the area including the front log at that time or the block is across the next area (Step 121).

When the block secured in Step 120 is across the areas, file processing unit 21 releases the block secured in Step 120 and secures blocks that are needed to write the data in the next area (Step 122).

Successively, file processing unit 21 generates area management information and logs for the area that newly secures the block in Step 122 (Step 123). The area management information includes the sequence number of the area. The sequence number to be written in the area management information is a value larger than the sequence number of the area including the front log at that time.

Further, the log includes the header and the data. It is assumed that a version number to be written in the header is a value larger than the version number of the front log at that time. Based on this arrangement, the version number of the new front log is largest among all the version numbers of logs, and the front log can be determined.

Successively, file processing unit 21 writes the area management information and the log into the area secured in storage medium 22 (Step 124). Also, based on this writing, file processing unit 21 changes the information that is to be stored therein to the front log written in Step 124.

On the other hand, when the block secured in Step 120 is across the areas, file processing unit 21 generates the header and the data of the log from data or the like designated by processor 20 (Step 125). Then, file processing unit 21 writes the data generated in Step 121 in the block secured in storage medium 22 in Step 120 (Step 126). Also, based on this writing, file processing unit 21 changes the information that is to be stored therein and shows the front log to the log written in Step 124.

After the process in Step 124 or the process in Step 126, file processing unit 21 searches the log corresponding to the file to be written and the block position from the existing log in storage medium 22 (Step 127). Then, it is determined whether or not the file to be written and the block position are found as an existing log (Step 128).

When the file to be written and the block position exist as the existing log, file processing unit 21 sets an invalid flag for the existing log (Step 129), and the process is finished. When there is no file to be written and no block position exists as an existing log, file processing unit 21 finishes the process as is.

Incidentally, as described above, according to the second embodiment, the area management information including the sequence number of each log area is arranged in the area including each log area so that it is to be continuous with the log area, and this is different from the first embodiment. Based on this arrangement, since the area management information and the log can be written as a continued block by one process, it is possible to reduce the occurrence of a contradictory state in which only one item of the area management information and corresponding log is updated, and in which no front log exists in the area having the maximum sequenced number.

Also, if the entry of each log area is not used as an erasing unit, the number of deletions cannot be set to be similar to the number of rewriting cycles. In a storage medium whose minimum erasing unit is large, such as NAND-type flash memory, when entries are gathered in the sequence number area, each entry area becomes larger than necessary and the use efficiency of the storage medium is poor. However, in the second embodiment, the area management information is arranged in a first portion in the corresponding area. Therefore, when the front log shifts to the area and the area management information must be updated, the log to be written and the area management information are within the same area. Therefore, though no minimum data erasing unit is allocated for the area management information, the number of erase operations and the number of rewrite operations can be matched, and use efficiency of the storage medium is good.

Incidentally, when a block is across the areas in Step 121 in FIG. 11, in the second embodiment, a new block is allocated to the next area. The reason is that reason, because area management information exists in each area, a log cannot be stored across areas. However, the present invention is limited to this. When data to be stored is apt to be across log areas, the data may be divided into two logs. Then, one log may be stored in the previous log area and the other log may be stored in a new log area.

Specifically, in Step 122 in FIG. 11, data is divided into two logs, which comprise a portion within the block allocated in Step 120 and a remaining portion, and the block may be allocated to the remaining portion.

Next, explanations are given of the operation when file processing unit 21 abnormally terminates the writing process and a contradiction arises as regards the invalid flag.

Here, in the writing process shown in the flow chart in FIG. 11, it is assumed that file processing unit 21 abnormally terminates the process after step 124 is finished but before step 129 is performed, or after step 126 is finished but before step 129 is performed. In this case, two valid logs for storing the same block of the same file remain in storage medium 22. Then, in this case, the larger version number in the header indicates new data. Then, file processing unit 21 validates the log of the larger version number, for example, by setting only the invalid flag of the log having the small version number in the mount process. Based on this operation, when the use of storage medium 22 is restarted after abnormal termination, the correct data file can be used.

Incidentally, in the second embodiment, when a NAND-type flash memory is used, a part of an additional area in each page of the flash memory may be used as a storage location for the sequence number. Based on this arrangement, the use efficiency of storage medium 22 can be improved.

Further, in Step 122 in the flow chart shown in FIG. 11, the block for storing the log is allocated to the next area, however, the present invention is not limited to this. As another method, data to be written may be divided into a portion in a range within the area including the front log (hereinafter, called a first portion) and a remaining portion (hereinafter, called a second portion) and may be a plurality of logs. Then, the first portion may be stored in the area including the front log and the second portion may be stored in the next area. Based on this arrangement, there is no block that is not used in storage medium 22, and the use efficiency of storage medium 22 can be improved.

Figure 12:
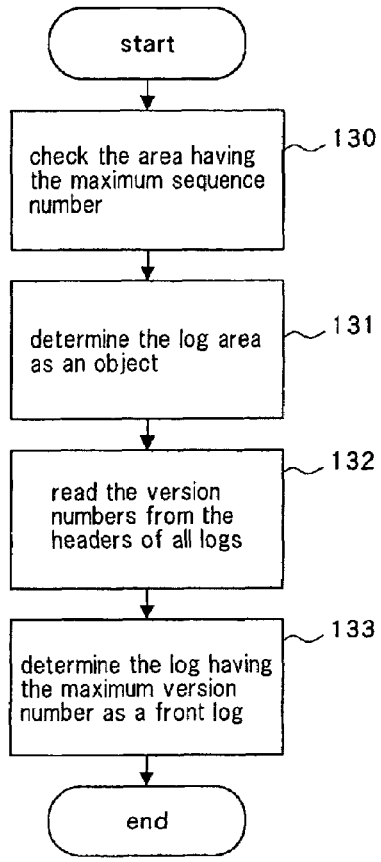
FIG. 12 is a flow chart showing an operation of the file processing unit when starting to use the file system.

Next, explanations are given of the operation of file processing unit 21 when the use of the file system is started. FIG. 12 is a flow chart showing the operation of file processing unit 21 when the use of the file system is started. At the start of use, file processing unit 21 executes various processes, however, only explanations are given of the process for searching the range of the front log, which is related to the present invention.

Referring to FIG. 12, file processing unit 21, first, reads the sequence number from the area management information of all areas in storage medium 22, and checks the (divided) area having the maximum sequence number (Step 130). Then, file processing unit 21 determines the log area in the area as an object used to search a front log (Step 131). Successively, file processing unit 21 reads the version numbers from the headers of all logs in the log area (Step 132).

Then, file processing unit 21 searches the maximum version number among the obtained version numbers and determines the log having the maximum version number as a front log (Step 133). The front log is determined in this way.

Further, the file system of the second embodiment performs the garbage collection process, similar to the first embodiment.

Also, the area management information of areas except the area including the front log is erased when the garbage collection process is performed. In Step 130 in the flow chart in FIG. 12, the area management information, which is erased, is not compared.

As described above, according to the second embodiment, since the area management information of each log area is arranged in the same area as the corresponding log area, the area management information and the log can be written by one process as a continued block. Therefore, it is possible to reduce an occurrence of a contradictory state in which only one item of the area management information and corresponding log is updated, and in which no front log exits in the area having the maximum sequence number.

Also, in the writing process in the above-described first or second embodiment, reference information indicating the rearmost log at that time may be added to the header of a log to be newly written. As an example of the reference information, an off-set address indicating a unique position in the storage medium may be mentioned. When the front log is identified at the start of use of the file system, the process progresses from the log that is indicated by the reference information stored in the header of the log in the front direction, and a first valid log is a rearmost log. Therefore, when the rearmost log is identified, there is no need to check whether all logs are valid or invalid.

Based on this arrangement, when the rearmost log must be identified at the start of use of the file system, the time for identifying the rearmost log can be shortened by using the reference information, and the time for the start of use of the file system can be shortened.

Further, the reference information indicating the rearmost log at the time of writing the sequence number may be added to the entry for storing the sequence number corresponding to the log area according to the first or second embodiment, as described above. In this case, in the writing process, when a log is written in a new log area, the reference information indicating the rearmost log at that time may be added. When the log area including the front log can be identified at the start of use of the file system, the process is advanced from the log indicated by the reference information stored in the entry corresponding to the log area in the front direction, and a first valid log is a rearmost log. Therefore, when the rearmost log is identified, there is no need to check whether all logs are valid or invalid Further, not only the sequence number used to detect the front log (hereinafter, called a first sequence number) but also the sequence number used to detect the rearmost log (hereinafter, called a second sequence number) may be added to the entry for storing the sequence number corresponding to the log area according to the first or second embodiment, as described above. In this case, when the rearmost log is changed across log areas in the garbage collection process in which the rearmost log is changed, file processing unit 21 may store the second sequence number, that is larger than the second sequence number of the log area including the rearmost log before being changed, in the entry corresponding to the log area including the new rearmost log. Then, at the start of use of the file system, file processing unit 21 may specify the rearmost log in accordance with the second sequence number in the same manner that the front log is specified in accordance with the first sequence number. The log area including the newest rearmost log can be known by referring to the second sequence number. Then, the log having the smallest version number among the valid logs in the log area is a rearmost log.

Based on this arrangement, also, when the rearmost log must be identified at startup of the file system, the time for identifying the rearmost log can be shortened, and the file system startup time can be shortened.

Third Embodiment

In the first and second embodiments, both the data area for storing logs and the management area for storing the management information, such as like a sequence number, are each divided into pluralities of areas, however, in the third embodiment, only the area for storing the management information is divided into a plurality of areas.

Figure 13:
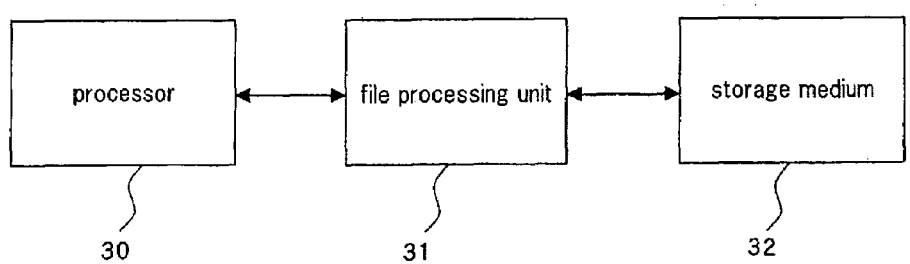
FIG. 13 is a block diagram showing a configuration of a computer system according to the third embodiment.

FIG. 13 is a block diagram showing a configuration of a computer system according to the third embodiment. Referring to FIG. 13, the computer system includes processor 30, file processing unit 31, and storage medium 32. Processor 30 and storage medium 32 are similar to processor 10 and storage medium 12 in the first embodiment.

File processing unit 31 mediates access from processor 30 to storage medium 32 and writes and reads a file to/from storage medium 32 according to a request from processor 30, similar to file processing unit 11.

Also, the file system used in file processing unit 31 of the third embodiment is "log-structured". Therefore, even if the file is written into the block in the file that is already stored in storage medium 32, i.e., "update writing", file processing unit 31 does not write over the old data, and generates and adds a new log into storage medium 32.

File processing unit 31 of the third embodiment is different from that of the first embodiment in that only the area for storing the management information is divided into a plurality of areas and the area for storing logs is not divided.

Figure 14:
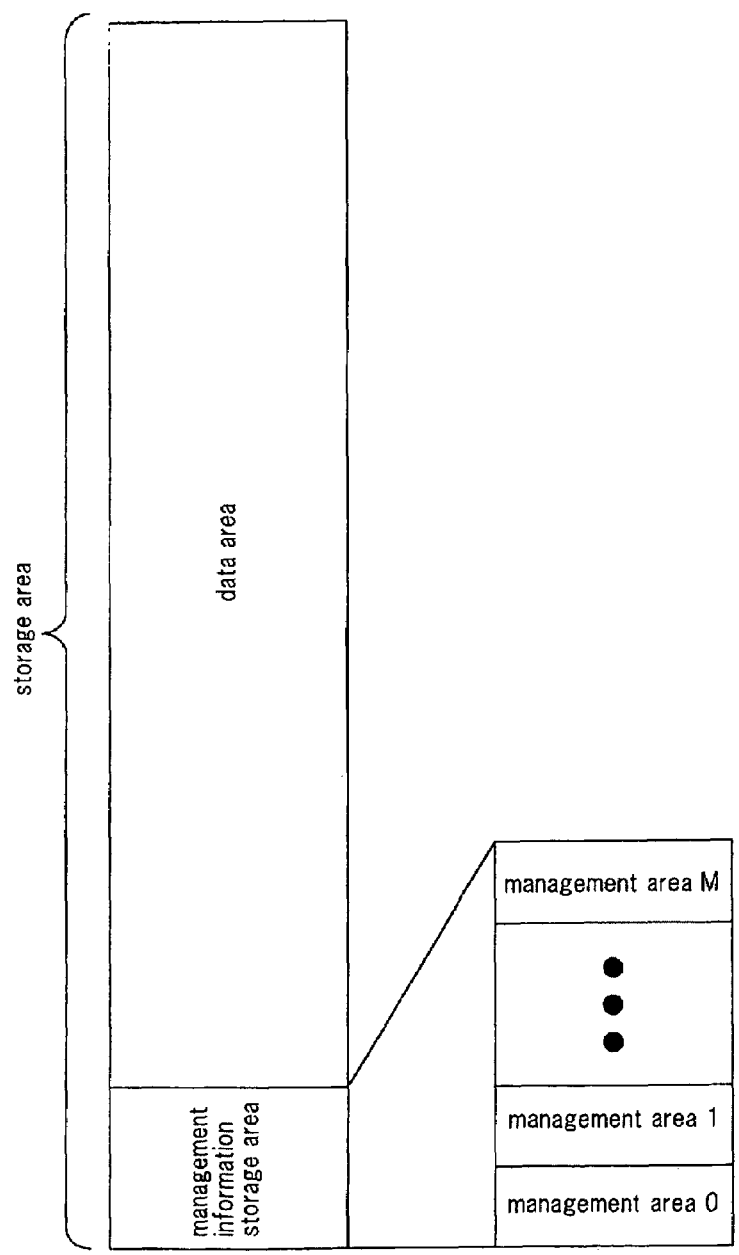
FIG. 14 is a view showing an image of arrangement of data stored in a storage medium according to the third embodiment.

FIG. 14 is a view showing the image of arrangement of data stored in the storage medium according to the third embodiment. Referring to FIG. 14, the storage area of storage medium 32 is divided into a management information storage area and a data area. Further, the management information storage area is divided into a plurality of areas O to M.

In each management area, the reference information of logs written into the data area and the version number of the management area are stored. The sequence number in the third embodiment is different from the sequence number in the first embodiment and is the number indicating the order in which the reference information of logs is written. The newness of each management area can be known by the sequence number. The reference information of logs is information indicating logs that are written in the data area, and is shown by, for example, an off-set address. The log indicated by the reference information in the newest management area can be determined as the front log. The log is similar to that of the first embodiment, and includes the header part and the data part, as shown in FIG. 3.

Next, operation of the computer system is explained in the third embodiment.

The operation of file processing unit 31 which receives a request from processor 30 is similar to the operation of file processing unit 11 of the first embodiment.

Figure 15:
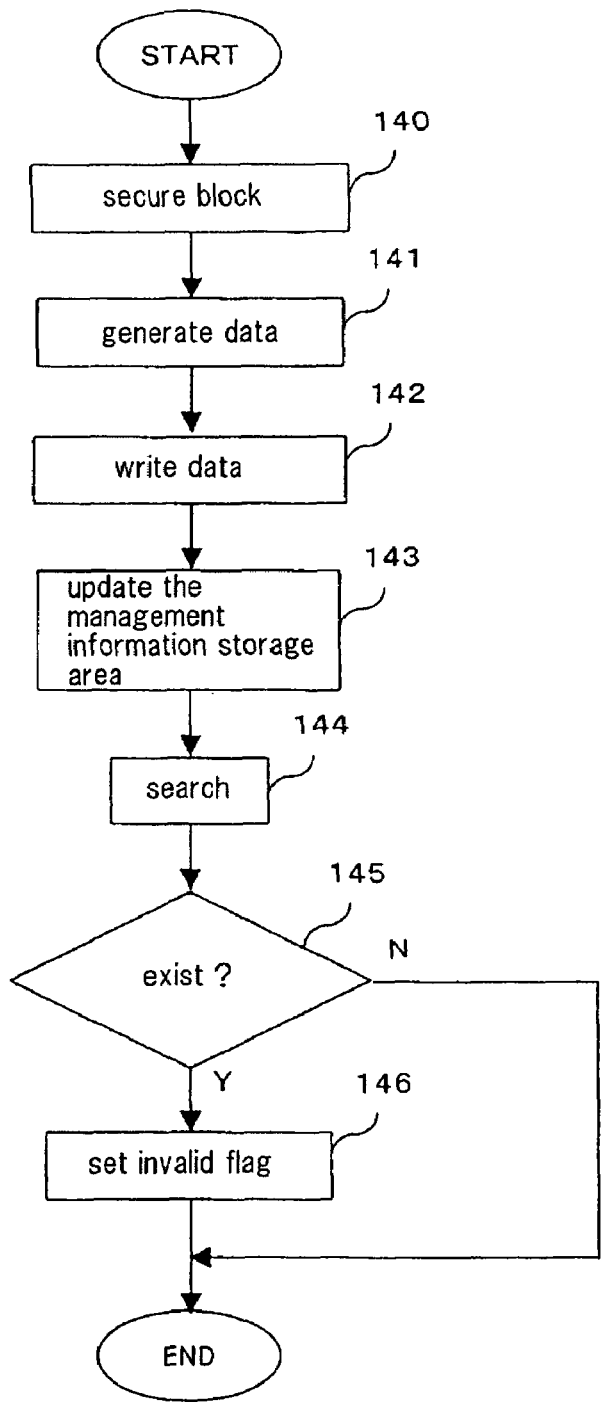
FIG. 15 is a flow chart showing a writing operation of a file processing unit according to the third embodiment.

Next, explanations are given of the operation of file processing unit 31 that receives a request from processor 30 to write a file. FIG. 15 is a flow chart showing the writing operation of file processing unit 31 in the third embodiment. File processing unit 31 receives a request from processor 30 to write data and performs the write operation.

Referring to FIG. 15, first, file processing unit 31 secures blocks that are needed to write the designated data in the next area to the front log that is already stored in storage medium 32 (Step 140). Then, file processing unit 31 generates a header to be written in the header part of the log and data to be written into the data part (Step 141).

Successively, file processing unit 31 writes the log including the header and the data generated in Step 141 into the block secured in Step 140.

Since the log written in Step 142 is a new front log, file processing unit 31 updates the management information storage area (Step 143). At this time, file processing unit 31 searches the entry having the maximum sequence number among entries and checks the entry of the management area in which the newest management information is stored at that time. Then, file processing unit 31 stores the reference information of the log that has been newly stored and stores a sequence number larger than the maximum sequence number.

Then, file processing unit 31 sets the log written in Step 142 as the front log, searches storage medium 32 to determine whether there is a log relevant to the file to be written, whether there is a block position (Step 144), and whether the relevant log can be found (Step 145).

When the applicable log to the file to be written and the block position is found, file processing unit 31 sets the invalid flag of the log (Step 146) and terminates the process. When no applicable file is found, file processing unit 31 terminates the process as is.

Figure 16:
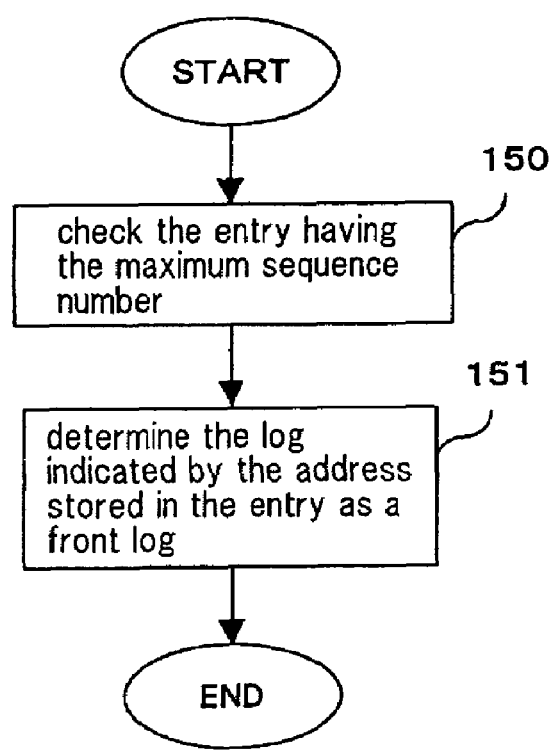
FIG. 16 is a flow chart showing an operation of the file processing unit when starting to use the file system according to the third embodiment.

Next, explanations are given of the operation of file processing unit 31 when use of the file system is started. FIG. 16 is a flow chart showing the operation of file processing unit 31 when the use of the file system according to the third embodiment is started. At the start of use, file processing unit 31 executes various processes, however, only explanations are given of the process which is related to the present invention for searching the range of the front log.

Referring to FIG. 16, file processing unit 31, first checks the entry having the maximum sequence number in management information storage area in storage medium 32 (Step 150). Then, file processing unit 31 acquires the reference information (offset address) of the log stored in the entry and determines the log indicated by the reference information as a front log (Step 151).

Next, explanations are given of the operation with consideration given to a case in which file processing unit 31 abnormally terminates the writing process and a contradiction occurs in the newest log between the management information storage area and the data area.

Here, in the writing process shown in the flow chart in FIG. 15, it is assumed that file processing unit 31 abnormally terminates the process after step 142 is finished but before step 143 is performed. In this case, a situation may occur in which the log corresponding to the entry given with the maximum sequence number in the management information storage area is not a front log, in fact, and an actual front log exists in far side of the log having maximum sequence number.

When the writing process is normally finished, the area subsequent to the front log stored in the data area is in an erased state or in a state in which there are logs stored in the pervious cycle that have a smaller version number than that of the front log.

Then, a check may be performed for the area or a subsequent area of the log that is determined as the front in accordance with the sequence number in the entry stored in the management information storage area. File processing unit 31 checks the entry of the maximum sequence number in the management information storage area. Then, file processing unit 31 checks the area and subsequent areas of the log having the maximum sequence number until the areas are erased or until the version number of the stored log becomes small. Successively, the log is determined to be front log just before it enters the erased area or just before the version number becomes smaller.

Further, when the entry of the maximum sequence number is not the front log, the sequence number that is larger than the maximum sequence number until then and the reference information of the front log are stored in the next entry. Based on this arrangement, the state in storage medium 32 can be corrected, the time that the process needs to detect the front log can be shortened when the use of the file system is started next time.

According to the third embodiment, in the "log-structured" file system, when a log is stored in the data area, the entry of the management information including the reference information of the log and the version number indicating the order of storing is stored into the management information storage area. Therefore, the front log can be easily detected by referring to the management information storage area though the entire storage area is not checked. Also, since multiple pieces of the management information are stored sequentially into the plurality of entries in the management information storage area, the number of erase operations of the management information storage area can be reduced and the usable period of the storage medium can be prolonged.

Incidentally, in the third embodiment, the front log is detected as an example, however, the present invention is limited to this. As another example, the present invention is similarly available to detect an index file in the LFS. In this case, version numbers may be given to super blocks indicating the position of the index file and may be stored sequentially into a plurality of entries.

While preferred embodiments of the present invention have been described using specific terms, such description is for illustrative purposes only, and it is to be understood that changes and variations may be made without departing from the spirit or scope of the following claims.

What is claimed:

1. A file management method in a log-structured file system for storing accesses to files that are sequentially performed by sequentially adding logs, comprising:
   previously dividing a storage area of a storage medium into a data area for storing a log including data of a file and a management area that can store management information related to the log stored in said data area for a plurality of entries;
   adding and storing said management information including a first number into said management area as a new entry without the management information being overwritten on a previous entry, the first number indicating the order of writing a log into said data area; and
   searching the newest entry in accordance with said first number and detecting a front log by using the management information of the entry;
   wherein said data area includes a plurality of small data areas and said management area includes a plurality of small management areas corresponding to said plurality of small data areas, and when a log is added and there is a need to use a new small data area for adding the log, the entry of said management information is stored in the small management area corresponding to the new small data area,
   wherein a header of said log includes a second number indicating the order of writing the log into said storage medium, and said detecting the front log includes
   finding the newest entry in accordance with the first number stored in each small management area in said management area,
   determining the small data area corresponding to the small management area of said newest entry as an object to be searched, and
   determining the newest log in accordance with second numbers of all logs in said small data area determined as the object to be searched and setting the log as the front log.

2. The file management method according to claim 1, wherein the entry of said management information to be stored in said small management area further includes start position information of a log that is first stored in each of corresponding small data areas, and wherein,
   when said front log is detected, a boundary of logs stored in said small area is recognized by using said start position information.

3. The file management method according to claim 1, wherein each of said small management areas is arranged within the corresponding small data area.

4. The file management method according to claim 3, wherein said small management area is arranged in the corresponding small data area adjacently to a portion first used to store the log.

5. The file management method according to claim 1, wherein when a log is added into said storage medium and no capacity that can be used to store the log that is to be added remains in the small data area that stores the front log at that time, the log is added in a next small data area to said small data area in which said front log is stored.

6. The file management method according to claim 1, wherein, when a log is added to said storage medium, log reference information indicating a position of the log is stored in the entry of said management information together with said first number.

7. The file management method according to claim 6, wherein said detecting the front log includes detecting a log indicated by the log reference information included in said newest entry as a front log.

8. The file management method according to claim 7, wherein, when there is a log provided with a second number that is newer than the second number of the log in the next or the subsequent area of the log indicated by the log reference information included in said newest entry, a log provided with the newest second number is regarded as a front log.

9. The file management method according to claim 1, wherein a flag in a header of said log indicates validity or invalidity of said log, and wherein, when said log is added and there is an existing valid log that includes previous data relative to the same writing location as the log in said storage medium, the flag of the existing log is invalidated.

10. The file management method according to claim 9, wherein when a use of said storage medium is started and there is a plurality of valid logs with the same writing location, the newest log is found among the plurality of valid logs in accordance with said second number, and logs except the newest log are invalidated.

11. The file management method according to 10, wherein the entry of said management information includes rearmost reference information indicating the newest rearmost log at the time when said entry is written, and wherein a process of detecting a rearmost log further comprises searching a valid log among logs indicated by the rearmost reference information included in the newest entry in a front direction; and comprises determining a valid log that is first found as a rearmost log.

12. The file management method according to claim 9, wherein said storage medium is a flash memory in which bit data becomes "0" in an erased state, and said flag indicates valid when it is "1" and indicates invalid when it is "0".

13. The file management method according to 12, wherein the entry of said management information includes rearmost reference information indicating the newest rearmost log at the time when said entry is written, and wherein a process of detecting a rearmost log further comprises searching a valid log among logs indicated by the rearmost reference information included in the newest entry in a front direction; and comprises determining a valid log that is first found as a rearmost log.

14. The file management method according to claim 9, wherein said log includes rearmost reference information indicating a rearmost log at the time that the log is added, and wherein a process of detecting a rearmost log further comprises searching a valid log among logs indicated by the rearmost reference information included in the header of the front log in a front direction; and comprises determining a valid log that is first found as a rearmost log.

15. The file management method according to claim 9, wherein the entry of said management information includes rearmost reference information indicating the newest rearmost log at the time when said entry is written, and wherein a process of detecting a rearmost log further comprises searching a valid log among logs indicated by the rearmost reference information included in the newest entry in a front direction; and comprises determining a valid log that is first found as a rearmost log.

16. The file management method according to claim 1, further comprising:
   when a rearmost log is changed across small data areas, storing management information including a third number indicating an order of including the rearmost log, in a small management area corresponding to a small data area that newly includes the rearmost log;
   as a process of detecting the rearmost log,
   finding the entry that most newly includes the rearmost log in accordance with the third number stored in each small management area in said management area;
   determining a small data area corresponding to the small management area of the entry that most newly includes the rearmost log as an object to be searched; and
   determining the oldest log from the second number of valid logs in said small data area determined as the object to be searched and regarding the log as the rearmost log.

17. The file management method according to claim 1, wherein a process of detecting said front log further comprises:
   in a case in which the newest log is determined from said small data area determined as the object to be searched, when logs are stored to an end of said small data area and when the second number of the log stored at the end is newest among said small data area, checking the second number of a first log in the next small data area to said small data area as the object to be searched; and
   when said second number of the log that is first stored in said next small data area is newer than said second number of the log that is stored in the end of said small data area as said object to be searched, changing the object to be searched to said next small data area and searching the front log again.

18. The file management method according to claim 17, wherein, when the object to be searched is changed to the next small data area, the entry of said management information is stored in a small management area corresponding to the next small data area.

19. A file management apparatus using a log-structured file system for storing accesses to files that are sequentially performed by sequentially adding logs, comprising:
   a storage medium provided with a storage area that can store the file;
   a processor that accesses the file stored in said storage medium; and
   a file processing unit that previously divides the storage area of said storage medium into a data area for storing a log including data of the file and a management area that can store management information related to the log stored in said data area for a plurality of entries and that adds and stores said management information including a first number into said management area as a new entry without the management information being overwritten on a previous entry, the first number indicating the order of writing a log into said data area,
   wherein said file processing unit divides said storage area so that said data area includes a plurality of small data areas and said management area includes a plurality of small management areas corresponding to said plurality of small data areas, and when a log is added and there is a need to use new small data area for adding the log, stores an entry of said management information in the small management area corresponding to the new small data area,
   wherein a header of said log includes a second number indicating the order of writing the log into said storage medium, and wherein said file processing unit, in the process of detecting a front log, finds a newest entry in accordance with the first number stored in each small management area in said management area, determines the small data area corresponding to the small management area of said newest entry as an object to be searched, and determines the newest log in accordance with the second numbers of all logs in said small data area determined as the object to be searched.

20. The file management apparatus according to claim 19, wherein each of said small management areas is arranged within the corresponding small data area.

21. A file management apparatus using a log-structured file system for storing accesses to files that are sequentially performed by sequentially adding logs, comprising:
   a storage medium provided with a storage area that can store the file;
   processor means for accessing the file stored in said storage medium; and
   file processing means for previously dividing the storage area of said storage medium into a data area for storing a log including data of the file and a management area that can store management information related to the log stored in said data area for a plurality of entries and for adding and storing said management information including a first number into said management area as a new entry without the management information being overwritten on a previous entry, the first number indicating the order of writing a log into said data area,
   wherein said file processing means is for dividing said storage area so that said data area includes a plurality of small data areas and said management area includes a plurality of small management areas corresponding to said plurality of small data areas, and when a log is added and there is a need to use new small data area for adding the log, stores an entry of said management information in the small management area corresponding to the new small data area,
   wherein a header of said log includes a second number indicating the order of writing the log into said storage medium, and wherein said file processing means, in the process of detecting a front log, finds a newest entry in accordance with the first number stored in each small management area in said management area, determines the small data area corresponding to the small management area of said newest entry as an object to be searched, and determines the newest log in accordance with the second numbers of all logs in said small data area determined as the object to be searched.

22. A computer program product storing a program for causing a computer to execute a file management process in a log-structured file system for storing accesses to files that are sequentially performed by sequentially adding logs, said process comprising:
   previously dividing a storage area of said storage medium into a data area for storing a log including data of the file and a management area that can store management information related to the log stored in said data area for a plurality of entries; and adding and storing said management information including a first number into said management area as a new entry without the management information being overwritten on a previous entry, the first number indicating the order of writing a log into said data area, wherein said data area includes a plurality of small data areas and said management area includes a plurality of small management areas corresponding to said plurality of small data areas, and when a log is added and there is a need to use a new small data area for adding the log, the entry of said management information is stored in the small management area corresponding to the new small data area, wherein a header of said log includes a second number indicating the order of writing the log into said storage medium, and wherein, as a process of detecting a front log, the newest entry is found in accordance with the first number stored in each small management area in said management area, the small data area corresponding to the small management area of said newest entry is determined as an object to be searched, and the newest log is determined in accordance with the second numbers of all logs in said small data area determined as the object to be searched, and the log is regarded as a front log.

23. The computer program product according to claim 22, wherein each of said small management areas is arranged within the corresponding small data area.

* * * * *